Nov. 29, 1932.  F. M. GRAHAM  1,889,313
RAIL JOINT LUBRICATING DEVICE
Filed March 31, 1930
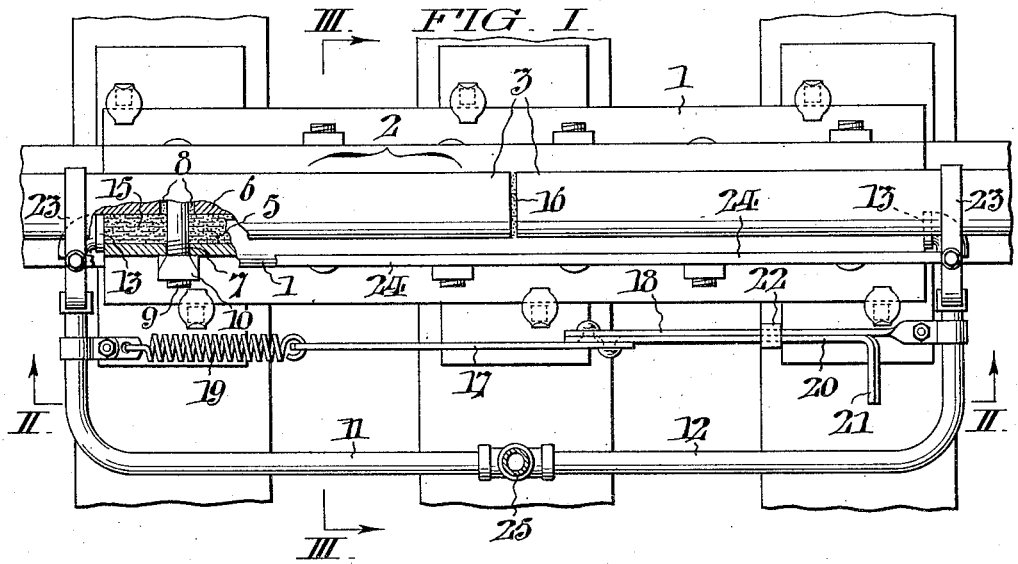
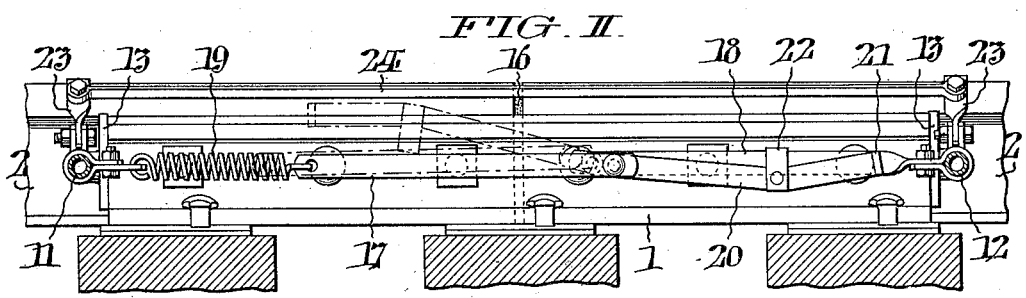
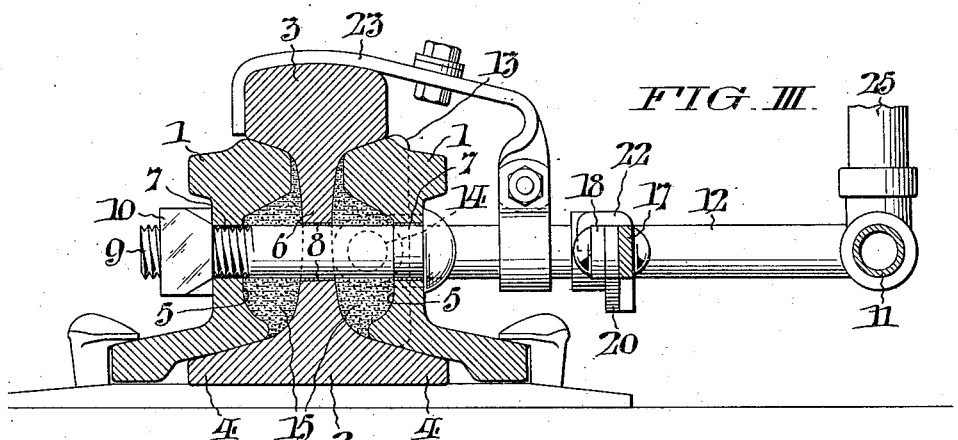
WITNESSES
INVENTOR:
Frederick M. Graham,
BY
ATTORNEYS.

Patented Nov. 29, 1932

1,889,313

UNITED STATES PATENT OFFICE

FREDERICK M. GRAHAM, OF HOLLIDAYSBURG, PENNSYLVANIA

RAIL JOINT LUBRICATING DEVICE

Application filed March 31, 1930. Serial No. 440,266.

This invention relates to apparatus for lubricating the rail joints of railway track.

It has heretofore been proposed to supply lubricant to the areas between joint bars and the abutting ends of rails for the purpose of reducing track noises and wear, and to maintain freedom of movement between rails and joint bars, thus permitting expansion and contraction of the rails incident to temperature changes. Such methods have involved the use of pre-formed or molded strips of packing material composed of an absorbent base impregnated with a lubricant, the packing strip being adapted to fill the areas between the rail webs and joint bars. To replace the lubricant packing, it is necessary to remove the joint bars, an expensive and laborious operation where a considerable length of track is to be lubricated at the rail joints. Furthermore, the methods heretofore used have not resulted in satisfactory lubrication at the bolt threads and interior surfaces so as to prevent these parts from rusting.

One object of my invention is to provide a portable unit having means for supplying a lubricant to the rail joints in such manner as to fill completely the spaces between adjacent rail ends, the spaces between rail webs and joint bars, the spaces around bolt threads, and the interior surfaces of the joints, without necessitating the removal of joint bars. For this purpose, I preferably use a lubricant of the consistency of a thick grease which is capable of being forced under pressure into small apertures and yet sufficiently viscous so that the lubricant will remain in the joint for a considerable period of time.

Another object of my invention is to provide means carried on a portable unit for effecting a substantial closure of the areas to be lubricated while the lubricant is being applied.

Other objects and advantages of the invention will be apparent from the detailed description of a preferred embodiment thereof which follows and which has reference to the accompanying drawing.

Of the drawing:

Fig. I represents a plan view of a rail joint with a lubricating device attached.

Fig. II represents a section of the same taken along the lines II—II of Fig. I; and, Fig. III represents a section of the same taken along the lines III—III of Fig. I.

In the drawing there is illustrated a form of lubricating apparatus embodying my invention, the particular form shown being adapted for attachment to a single joint bar at one side of a rail. By an obvious duplication of parts the apparatus may be modified, as hereinafter explained, for attachment to a pair of joint bars on opposite sides of adjacent rail ends.

In Fig. I there is shown a pair of joint bars 1 (sometimes referred to as a "fish plate") forming an expansion joint for the ends of two adjacent rails 2. The joint bars 1 are of a standard construction fitting against the rail heads 3 and flanges 4 with their inner surfaces 5 spaced from the rail webs 6. A series of bolt holes 7 are provided in the joint bars, and corresponding holes 8 are provided in the ends of the rails 2. Through bolts 9 are inserted in the holes 7 and 8, and the joint bars 1 are brought together to grip the rail ends by tightening the nuts 10 on the bolts 9.

The bolt holes 8 in the rails 2 are considerably larger than the diameter of the bolts 9 so that the rails are free to expand and contract at the joint. To maintain this freedom of movement the interior surfaces of the joint, especially the threads of the through bolts 9, must be guarded against rusting and consequent freezing of the joint bars 1 to the rails 2.

The apparatus for supplying lubricant to the joint comprises a bifurcated supply line having branches 11 and 12, each branch having at its end a plate 13, the position of which is indicated in broken lines in Fig. III, adapted to fit against the web 6 of a rail at the end of a joint bar 1 and to form a substantially closed area 15 between the joint bar 1 and the rails 2. The plates 13 are provided with openings 14 to permit the passage of lubricant therethrough. It will be apparent that when a lubricant is forced under pressure through the openings 14, it will enter both ends of the rail joint simultaneously and move toward the center of the rail joint, gradually filling the area 15 between the rails 2 and joint bar 1 and will then fill the space 16 between adjacent rail ends. The lubricant will also find its way through the bolt holes 7 and 8, and at the threaded ends of the bolts 9 it will be forced through the spiral passage between the threads and the surrounding openings and will thus reach the nuts 10. All the interior surface of the joint may thus be lubricated.

To hold the closure plates 13 firmly against the ends of a joint bar 1, I preferably employ a toggle mechanism comprising links 17 and 18 attached to the branches 11 and 12 of the supply line, one link 18 having a spring 19. A lever 20 pivotally mounted on both links 17 and 18 and bent to form a handle 21 serves as a convenient means for drawing together the links 17 and 18. To draw the plates 13 together against the ends of a joint bar, the lever 20 is forced downward against the pressure of the spring 19 until both links 17 and 18, as well as the lever 20, are all in the same plane. The lever 20 is provided with a lug 22, which, when the links 17 and 18 are drawn together, engages one of the links to prevent further downward movement of the lever 20.

In addition to the toggle mechanism for drawing the closure plates 13 against the ends of a joint bar, I also preferably provide clamping means for securely holding the closure plates 13 against the rails 2. In the form shown the clamping means comprise hooks 23 on the supply line branches 11 and 12, each hook 23 being adapted to grip the head 3 of a rail. To add rigidity to the clamping means, a spreader 24 is bolted to each hook 23 adjacent the rail head. From the above description it will be apparent that the branches 11 and 12 of the supply line, while having sufficient flexibility to enable the closure plates to be drawn together incident to the operation of the toggle mechanism, connect one closure plate with the other at a spaced distance substantially corresponding to the length of a joint bar. Accordingly the lubricating device constitutes a unit which may be quickly moved from one rail joint to another and readily attached to and detached from a joint bar. Attachment of the unit to a rail joint merely involves the operation of bodily placing the unit astride the ends of a joint bar with the hooks 23 engaging the rail heads, and the movement of the toggle handle 21 to draw together the closure plates 13 about the ends of the joint bar.

There are a variety of methods for supplying lubricant under pressure to the line. One such method is shown in the copending application for United States Letters Patent of Frederick M. Graham and James B. McWilliams, Serial No. 440,265, filed March 31, 1930. The lubricant is supplied under pressure by means of a pump, the discharge connection of which is shown at 25. The entire apparatus including a lubricant reservoir may be designed to constitute a single portable unit.

It will be apparent that the apparatus here described and illustrated is adapted for attachment to a single joint bar, and it is possible to provide lubrication for both of a pair of joint bars by application of the device to one of the pair with escape of lubricant through the bolt holes to the opposite side of the rails. However, to lubricate more thoroughly a pair of joint bars, it may be advisable to effect a simultaneous closure of the joints on both sides, and for this purpose the apparatus can be easily modified to include an additional pair of closure plates held by the branches 11 and 12 by suitable brackets bridging the rails so as to operate in the same manner as the plate 13. Such a modification is, of course, within the contemplation of my invention. Where adjacent rail ends are spaced with a considerable interval between them, it may also be desirable to plug the gap between them temporarily in order that the lubricant may completely fill the joint before being forced out through the gap.

I have found that lubrication of rail joints in the manner described may effect a substantial saving in track maintenance and repair. Not only does it insure the proper operation of expansion joints and eliminate rusting and freezing of parts, but there is a noticeable reduction in track noises.

While my invention has been described in some detail with reference to a specific embodiment, various changes in the form of apparatus used are within the contemplation of the invention, and such changes should not be deemed to constitute a departure from the spirit of the invention as hereinafter claimed.

Having thus described my invention, I claim:

1. An apparatus for lubricating rail joints at the joint bars comprising means for supplying a lubricant under pressure to the area between rails near their ends and a joint bar, and accompanying interconnected means gripping the ends of said joint bar to effect substantial temporary closure of said area.

2. A portable unit for lubricating rail joints at the joint bars comprising means for supplying a lubricant under pressure to the area between rails near their ends and a joint bar, and interconnected means adapted to be clamped together about the ends of said joint bar to effect substantial closure of said area.

3. A portable unit for lubricating rail joints at the joint bars comprising means for supplying a lubricant under pressure to the area between rails near their ends and a joint bar, closure plates for sealing said area at opposite ends of the joint bar, and means for drawing said closure plates together about the ends of said joint bar.

4. A portable unit for lubricating rail joints at the joint bars comprising a bifurcated supply line having at the ends thereof closure members each adapted to fit the hollow of a rail at opposite ends of a joint bar, said closure members being spaced at a distance substantially corresponding to the length of the joint bar, and means for supplying lubricant to the inside of the rail joint through said supply line and closure members with the lubricant simultaneously entering at both ends of the joint and moving toward the center thereof.

5. A device for lubricating rail joints at the joint bars comprising a lubricant supply line with two branches, each branch having means for substantially closing the area between adjacent rail ends and a joint bar at the ends of said joint bar, and means for drawing said branches together.

6. A device for lubricating rail joints at the joint bars comprising closure means adapted to fit the spaces between rail webs and the ends of a joint bar, toggle links for drawing said closure means together against the ends of said joint bar, and means for supplying a lubricant to the rail joint through said closure means.

7. A device for lubricating rail joints at the joint bars comprising closure means adapted to fit the spaces between rail webs and the ends of a joint bar, clamping means for maintaining said closure means against the rails, means for drawing said closure means together against the ends of said joint bar, and means for supplying a lubricant to the area thus closed.

8. A device for lubricating rail joints at the joint bars comprising closure means adapted to fit the spaces between rail webs and the ends of a joint bar, clamping means for maintaining said closure means against the rails, means for drawing said closure means together against the ends of said joint bar, and means for supplying a lubricant to the rail joint through said closure means.

9. An apparatus for lubricating rail joints comprising closure members fitting the hollow of a rail at opposite ends of a joint bar, means for supporting said closure members at a spaced distance substantially corresponding to the length of a joint bar, clamps for maintaining said closure members in temporary fixed relation to the rail joint, and means for supplying lubricant to the inside of the rail joint through said closure members.

In testimony whereof, I have hereunto signed my name at Altoona, Pennsylvania, this 24th day of March, 1930.

FREDERICK M. GRAHAM.